United States Patent
She et al.

(10) Patent No.: US 12,000,766 B2
(45) Date of Patent: Jun. 4, 2024

(54) AUTOMATICALLY-CLEANABLE THICKENING PERFORMANCE EVALUATION INSTRUMENT FOR DRILLING LOST CIRCULATION MATERIALS

(71) Applicant: Chengdu University of Technology, Chengdu (CN)

(72) Inventors: Jiping She, Chengdu (CN); Hao Zhang, Chengdu (CN); Yang Yang, Chengdu (CN); Bin Yang, Chengdu (CN); Yang Li, Chengdu (CN); Jianjun Ni, Chengdu (CN); Shiyu Zhang, Chengdu (CN); Ying Zhong, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 305 days.

(21) Appl. No.: 17/671,607

(22) Filed: Feb. 15, 2022

(65) Prior Publication Data
US 2023/0008746 A1    Jan. 12, 2023

(30) Foreign Application Priority Data
Jul. 9, 2021 (CN) .......................... 202110776765.4

(51) Int. Cl.
*G01N 11/00* (2006.01)
*B08B 9/08* (2006.01)
(Continued)

(52) U.S. Cl.
CPC ............ *G01N 11/14* (2013.01); *B08B 9/0808* (2013.01); *B08B 2209/08* (2013.01); *E21B 21/003* (2013.01); *G01N 2011/0006* (2013.01)

(58) Field of Classification Search
CPC .......... G01N 11/14; G01N 2011/0006; G01N 11/00; B08B 9/0808; B08B 9/087;
(Continued)

(56) References Cited

U.S. PATENT DOCUMENTS

| | | | |
|---|---|---|---|
| 2005/0132782 A1* | 6/2005 | Wallevik | G01N 11/14 73/54.28 |
| 2013/0045031 A1* | 2/2013 | Nagata | G03G 15/2025 399/327 |
| 2018/0266197 A1* | 9/2018 | Amanullah | G01N 15/082 |

* cited by examiner

*Primary Examiner* — Suman K Nath
(74) *Attorney, Agent, or Firm* — Bayramoglu Law Offices LLC

(57) ABSTRACT

An automatically-cleanable thickening performance evaluation instrument for drilling LCMs includes a cleaning device, a kettle body, a thickening motor, a heating component, a test ending component, a top cover, and a bottom cover, where upper and lower ends of the kettle body are both opened; the kettle body is arranged in a third bearing inner race, a third bearing outer race is connected to a first limb, and the first limb is configured to limit a position of the kettle body; and the kettle body is detachably connected to the thickening motor and driven by the thickening motor to rotate. The instrument can realize electric heating and air pressurization to simulate the underground environment, and the kettle body can be completely sealed, such that a measured thickening time is close to an actual thickening time. Moreover, the instrument can be automatically cleaned at the end of a test.

9 Claims, 3 Drawing Sheets

(51) Int. Cl.
*G01N 11/14* (2006.01)
*E21B 21/00* (2006.01)

(58) Field of Classification Search
CPC ....... B08B 2209/08; B08B 7/028; B08B 7/04; B08B 1/12; E21B 21/003
See application file for complete search history.

AUTOMATICALLY-CLEANABLE THICKENING PERFORMANCE EVALUATION INSTRUMENT FOR DRILLING LOST CIRCULATION MATERIALS

CROSS REFERENCE TO THE RELATED APPLICATIONS

This application is based upon and claims priority to Chinese Patent Application No. 202110776765.4, filed on Jul. 9, 2021, the entire contents of which are incorporated herein by reference.

TECHNICAL FIELD

The present disclosure relates to the field of drilling exploration, and in particular, to an automatically-cleanable thickening performance evaluation instrument for drilling lost circulation materials (LCMs).

BACKGROUND

Lost circulation is one of the most troublesome drilling problems. The costly drilling fluid leaks into the stratum, resulting in an increased economic cost, as well as some well control problems. About 20% to 25% of all wells worldwide undergo lost circulation, and thus lost circulation has always been a global concern. Through scientific research, LCMs characterized by bridging, high water loss, and curability have been developed in and outside China to form a series of drilling fluid pressure-bearing plugging technologies. Compared with conventional LCMs, curable LCMs have advantages such as high pressure-bearing plugging capacity, easy control of curing time, low price, simple preparation and operation processes, and are suitable for the formation occurring severe lost circulation. However, the curable LCMs are easily diluted by water in the formation, and the diluted curable LCMs have a weakened curing strength, a difficult control of a curing time and rate, and a higher construction safety risk.

A thickening performance evaluation instrument is an instrument used for the test of a curable plugging slurry in oil and gas wells, and the instrument can measure a consistency value of a curable plugging slurry and measure a thickening time. The thickening time is an important parameter to evaluate the performance of a curable LCM. Therefore, how to correctly evaluate the thickening performance of a curable LCM in laboratory research and establish a curable LCM measurement method is of great significance for avoiding lost circulation and protecting the reservoir. The existing room-temperature thickening performance evaluation instruments in the laboratory fail to simulate an underground high-pressure environment by pressurization due to the unsealed kettle body thereof. Moreover, the existing thickening performance evaluation instruments heat the kettle body by heating water, such that the temperature is too low to meet the requirements of the actual environment. In addition, a water bath is used for heating the kettle body, and water volatilizes under heat, which easily leads to uneven heating, such that a thickening time measured by the existing thickening performance evaluation instrument is much different from a thickening time in the actual environment.

In addition, since a thickening object is relatively viscous at the end of a thickening test, the thickening object, if not removed in time, will be solidified quickly and then will be difficult to remove. Further, because a thickening test usually takes a long time, a test operator cannot always look out for the thickening performance evaluation instrument, which makes the thickening object prone to being solidified in the thickening performance evaluation instrument. Moreover, since a kettle bottom and a kettle body in the existing thickening performance evaluation instrument are integrated and closed, the relevant personnel can only remove the thickening object from an upper opening of the kettle body, which requires a lot of manpower to remove the thickening object that is sticky to a specified degree or completely solidified.

SUMMARY

In view of the above-mentioned shortcomings in the art, the present disclosure provides an automatically-cleanable thickening performance evaluation instrument for drilling LCMs, which solves the problems that a thickening time measured by the existing thickening performance evaluation instrument is much different from a thickening time in the actual environment and it is inconvenient to clean after a test.

In order to achieve the above objective, the present disclosure adopts the following technical solutions:

An automatically-cleanable thickening performance evaluation instrument for drilling LCMs is provided, including a cleaning device, a kettle body, a thickening motor, a heating component, a test ending component, a top cover, and a bottom cover, where upper and lower ends of the kettle body are both opened; the kettle body is arranged in a third bearing inner race, a third bearing outer race is connected to a first limb, and the first limb is configured to limit a position of the kettle body; the kettle body is detachably connected to the thickening motor and driven by the thickening motor to rotate.

the top cover is arranged in a first bearing inner race to seal the upper end of the kettle body, a first bearing outer race is connected to a third limb, and the third limb is configured to limit a position of the top cover; a sensor mounting hole for mounting a sensor and a pressurized sealing hole for pressurizing an inside of the kettle body are formed on the top cover;

the bottom cover is arranged in a second bearing inner race to seal the lower end of the kettle body, a second bearing outer race is connected to a second limb, and the second limb is configured to limit a position of the bottom cover; a second gantry is provided at a bottom of the second bearing outer race, and the second gantry is provided with a second support column for supporting the bottom cover;

the test ending component includes the first bearing outer race, a magnetic coupling, and a touch switch, a first gantry is provided on the first bearing outer race, and the touch switch is arranged on the first gantry; an inner magnet of the magnetic coupling is movably arranged on a lower surface of the top cover such that the inner magnet can rotate axially relative to the top cover, and a lower surface of the inner magnet is connected to a blade; an outer magnet of the magnetic coupling is connected to a torque device, the torque device is arranged on the first gantry, and the outer magnet is provided with a pointer for triggering the touch switch; the first gantry is provided with a first support column for supporting the top cover;

the heating component includes a heating coil and an electrical connection ring arranged on the kettle body, the heating coil is connected to the electrical connection ring, and the electrical connection ring is slidably connected to a power supply brush and is connected to a power supply through the power supply brush;

a fixed shaft runs through the first limb and is fixed on a base; a first rotating platform is provided at a tail end of the first limb, the first rotating platform is located in a first rotating cavity, and the first rotating cavity is provided with a first rotating motor for driving the first rotating platform to rotate left or right; the first rotating cavity is connected to one end of a first column, the other end of the first column runs through the base, and a first lifter is provided for height adjustment of the first column;

the fixed shaft runs through the second limb and is fixed on the base; a second rotating platform is provided at a tail end of the second limb, the second rotating platform is located in a second rotating cavity, and the second rotating cavity is provided with a second rotating motor for driving the second rotating platform to rotate left or right; the second rotating cavity is connected to one end of a second column, the other end of the second column runs through the base, and a second lifter is provided for height adjustment of the second column;

the cleaning device includes a cleaning cylinder and a cleaning motor; a brush head is provided on a rotating shaft of the cleaning motor, and the cleaning motor is fixed on a second support arm; the cleaning cylinder is arranged on a side of the base; and a third lifter is provided on a side of the cleaning cylinder, and the second support arm moves up and down through the third lifter, such that when the kettle body is directly below the brush head, the brush head can be lowered into the kettle body for rotating cleaning.

Further, the first support column and the second support column may have the same structure, and each include a thread section, a non-directional rotating section, and a roller; and the roller may be arranged at a bottom of the non-directional rotating section, and a top of the non-directional rotating section may be movably connected to the thread section, such that the non-directional rotating section can rotate axially relative to the thread section.

Further, the thickening motor may be detachably connected to the kettle body through a gear assembly; the gear assembly may include a driving gear disc and a driven gear disc that match with each other; the driving gear disc may be connected to a rotating shaft of the thickening motor; and the driven gear disc may be sleeved on an outer wall of the kettle body.

Further, a tail end of the third limb may be placed in a fixed cavity and may be fixed in the fixed cavity by pins on the fixed cavity; and the fixed cavity may be fixedly connected to the base through a third column.

Further, the power supply brush may be fixed on the first limb.

Further, the thickening motor may be fixedly connected to the base through a first support arm; and the first support arm may be arranged in multiple sections that are fixed by screws in a detachable manner.

Further, a filter screen may be provided inside the cleaning cylinder.

Further, an ultrasonic vibration plate may be provided on a side wall of the cleaning cylinder.

Further, a V-shaped inclined surface may be provided at a bottom of the cleaning cylinder, and a drain port extending out of the cleaning cylinder may be formed at a bottom of the V-shaped inclined surface.

The present disclosure has the following beneficial effects:

1. The kettle body of the present disclosure can be completely sealed to simulate an underground high-pressure environment for a thickening object, which facilitates the acquisition of more actual thickening data. Moreover, the thickening performance evaluation instrument can be automatically cleaned at the end of a test, which effectively prevents a thickening object from solidifying in the kettle body and thus facilitates the subsequent use.

2. The kettle body can be electrically heated, and a heating temperature much higher than that of water heating can be achieved without medium conduction, which is more in line with the actual underground environment temperature. Moreover, an obtained thickening result is more in line with the actual situation.

3. Both upper and lower ends of the kettle body are opened, which is convenient for the charge and discharge of a thickening object, the cleaning of the kettle body, and the second use.

4. The filter screen can intercept a thickening object to prevent the thickening object from solidifying in the cleaning cylinder, and is also convenient to take the thickening object away from the cleaning cylinder.

5. The ultrasonic vibration plate can assist the brush head to clean the kettle body and bottom cover, thereby improving the cleaning effect.

In the figures: 1 represents a kettle body; 2 represents a first bearing outer race; 3 represents an inner magnet; 4 represents a first gantry; 5 represents a pressurized sealing hole; 6 represents a first support column; 7 represents an outer magnet; 8 represents a top cover; 9 represents a touch switch; 10 represents a pointer; 11 represents a sensor mounting hole; 12 represents a third limb; 13 represents a pin; 14 represents a fixed cavity; 15 represents a first rotating motor; 16 represents a first rotating cavity; 17 represents a first rotating platform; 18 represents a first column; 19 represents a fixed shaft; 20 represents a first limb; 21 represents a third column; 22 represents a second limb; 23 represents a second rotating motor; 24 represents a second rotating cavity; 25 represents a second rotating platform; 26 represents a second column; 27 represents a base; 28 represents a first lifter; 29 represents a second lifter; 30 represents a first support arm; 31 represents a screw; 32 represents a second support column; 33 represents a second gantry; 34 represents a second bearing outer race; 35 represents a bottom cover; 36 represents a thickening motor; 37 represents a driving gear disc; 38 represents a driven gear disc; 39 represents a third bearing outer race; 40 represents a blade; 41 represents a thread section; 42 represents a non-directional rotating section; 43 represents a roller; 44 represents a power supply brush; 45 represents an electrical connection ring; 46 represents a torque device; 47 represents a cleaning cylinder; 48 represents an ultrasonic vibration plate; 49 represents a drain port; 50 represents a V-shaped inclined surface; 51 represents a third lifter; 52 represents a filter screen; 53 represents a brush head; 54 represents a cleaning motor; and 55 represents a second support arm.

DETAILED DESCRIPTION OF THE EMBODIMENTS

Specific implementations of the present disclosure are described below to facilitate those skilled in the art to understand the present disclosure, but it should be known that the present disclosure is not limited to the scope of the specific implementations. For those of ordinary skill in the art, as long as various changes are within the spirit and scope of the present disclosure that are defined and determined by the attached claims, these changes are obvious, and all innovations using the concept of the present disclosure are protected.

Figure 1:
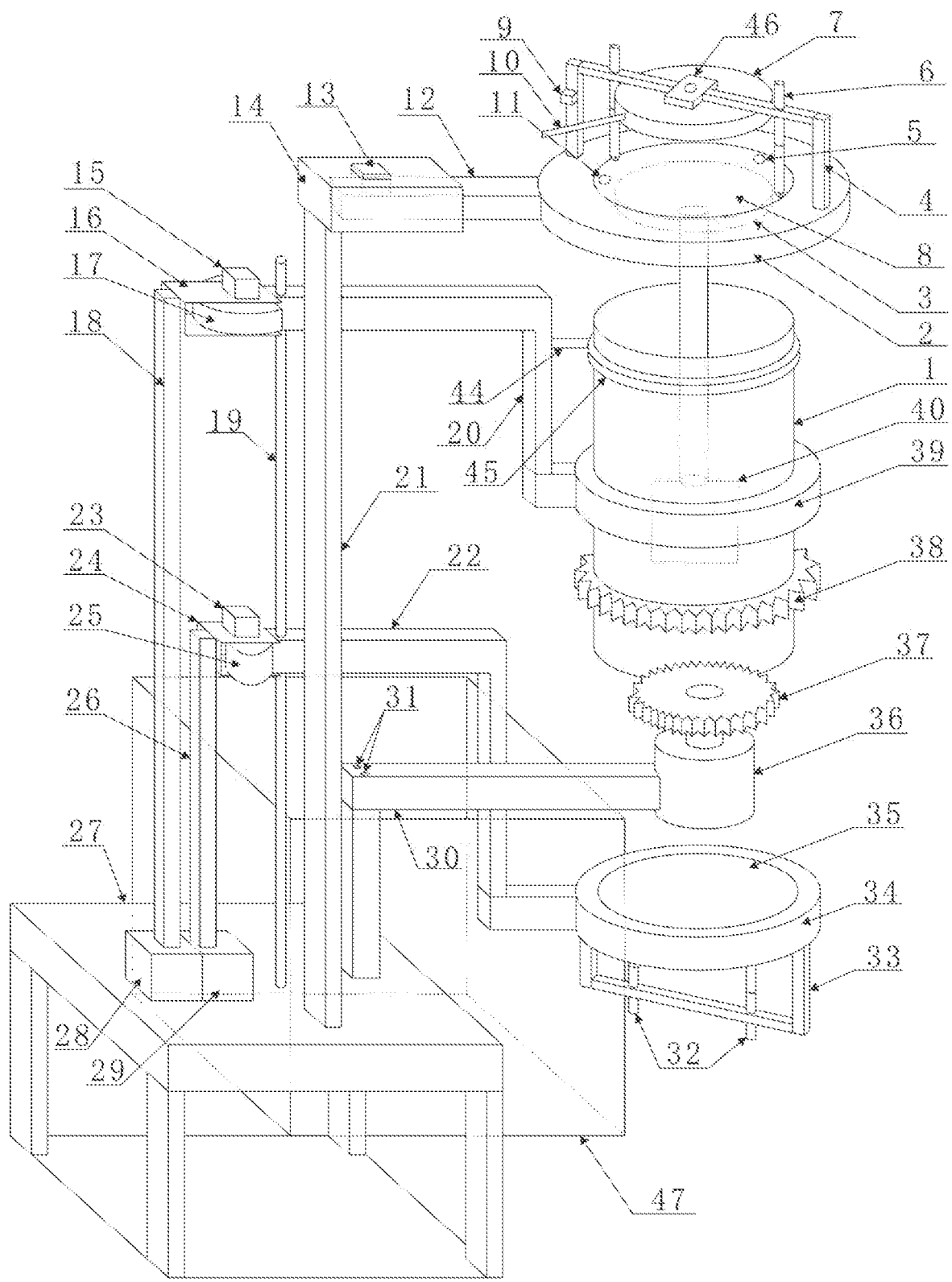
FIG. 1 is a schematic diagram illustrating the overall structure of the present disclosure.
Figure 3:
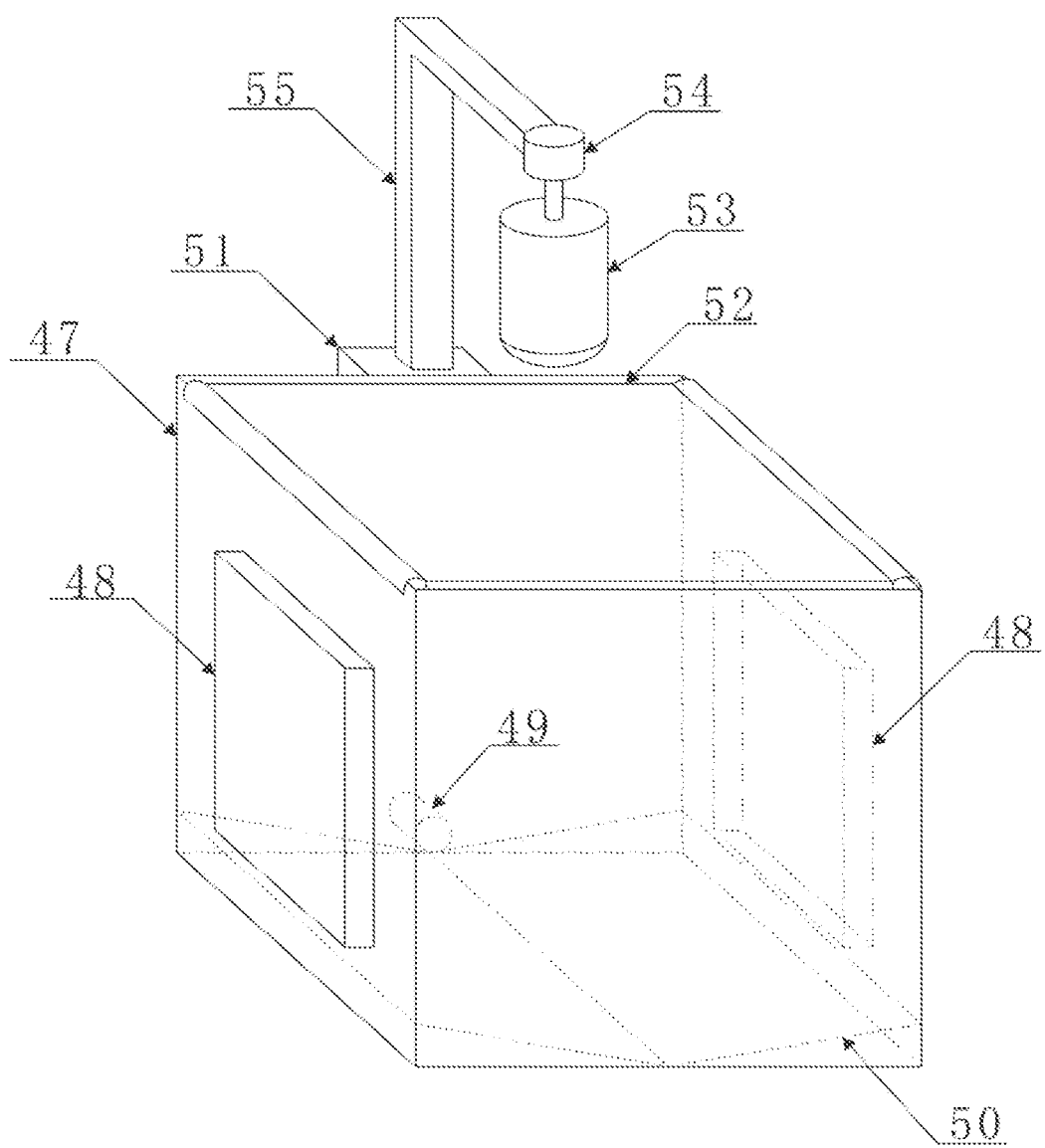
FIG. 3 is a schematic structural diagram of the cleaning device.

As shown in FIG. 1, the automatically-cleanable thickening performance evaluation instrument for drilling LCMs includes a cleaning device, a kettle body 1, a thickening motor 36, a heating component, a test ending component, a top cover 8, and a bottom cover 35, where upper and lower ends of the kettle body 1 are both opened; the kettle body 1 is arranged in a third bearing inner race, a third bearing outer race 39 is connected to a first limb 20, and the first limb 20 is configured to limit a position of the kettle body 1; the kettle body 1 is detachably connected to the thickening motor 36 and driven by the thickening motor 36 to rotate;

the top cover 8 is arranged in a first bearing inner race to seal the upper end of the kettle body 1, a first bearing outer race 2 is connected to a third limb 12, and the third limb 12 is configured to limit a position of the top cover 8; a sensor mounting hole 11 for mounting a sensor and a pressurized sealing hole 5 for pressurizing the inside of the kettle body 1 are formed on the top cover 8;

the bottom cover 35 is arranged in a second bearing inner race to seal the lower end of the kettle body 1, a second bearing outer race 34 is connected to a second limb 22, and the second limb 22 is configured to limit a position of the bottom cover 35; a second gantry 33 is provided at a bottom of the second bearing outer race 34, and the second gantry 33 is provided with a second support column 32 for supporting the bottom cover 35;

the test ending component includes the first bearing outer race 2, a magnetic coupling, and a touch switch 9, a first gantry 4 is provided on the first bearing outer race 2, and the touch switch 9 is arranged on the first gantry 4; an inner magnet 3 of the magnetic coupling is movably arranged on a lower surface of the top cover 8 such that the inner magnet 3 can rotate axially relative to the top cover 8, and a lower surface of the inner magnet 3 is connected to a blade 40; an outer magnet 7 of the magnetic coupling is connected to a torque device 46, the torque device 46 is arranged on the first gantry 4, and the outer magnet 7 is provided with a pointer 10 for triggering the touch switch 9; the first gantry 4 is provided with a first support column 6 for supporting the top cover 8;

the heating component includes a heating coil and an electrical connection ring 45 arranged on the kettle body 1, the heating coil is connected to the electrical connection ring 45, and the electrical connection ring 45 is slidably connected to a power supply brush 44 and is connected to a power supply through the power supply brush 44; the power supply brush 44 is fixed on the first limb 20; a tail end of the power supply brush 44 can be provided with a metal wheel, such that the power supply brush 44 slidably contacts the electrical connection ring 45 to reduce friction loss;

a fixed shaft 19 runs through the first limb 20 and is fixed on a base 27; a first rotating platform 17 is provided at a tail end of the first limb 20, the first rotating platform 17 is located in a first rotating cavity 16, and the first rotating cavity 16 is provided with a first rotating motor 15 for driving the first rotating platform 17 to rotate left or right; the first rotating cavity 16 is connected to one end of a first column 18, the other end of the first column 18 runs through the base 27, and a first lifter 28 is provided for height adjustment of the first column;

the fixed shaft 19 runs through the second limb 22 and is fixed on the base 27; a second rotating platform 25 is provided at a tail end of the second limb 22, the second rotating platform 25 is located in a second rotating cavity 24, and the second rotating cavity 24 is provided with a second rotating motor 23 for driving the second rotating platform 25 to rotate left or right; the second rotating cavity 24 is connected to one end of a second column 26, the other end of the second column 26 runs through the base 27, and a second lifter 29 is provided for height adjustment of the second column;

as shown in FIG. 3, the cleaning device includes a cleaning cylinder 47 and a cleaning motor 54; a brush head 53 is provided on a rotating shaft of the cleaning motor 54, and the cleaning motor 54 is fixed on a second support arm 55; the cleaning cylinder 47 is arranged on a side of the base 27; and a third lifter 51 is provided on a side of the cleaning cylinder 47, and the second support arm 55 moves up and down through the third lifter 51, such that when the kettle body 1 is directly below the brush head 53, the brush head 53 can be lowered into the kettle body 1 for rotating cleaning.

Figure 2:
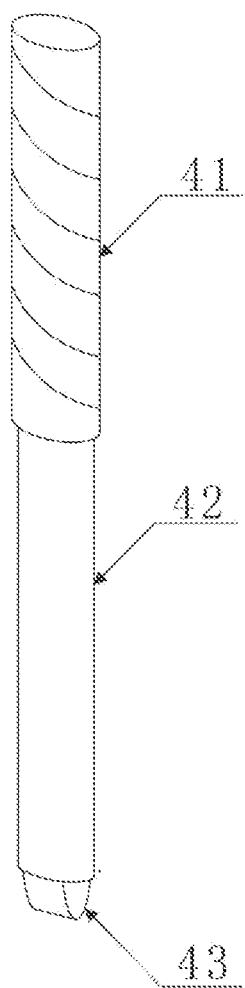
FIG. 2 is a schematic structural diagram of the support column.

As shown in FIG. 2, the first support column 6 and the second support column 32 may have the same structure, and each include a thread section 41, a non-directional rotating section 42, and a roller 43; and the roller 43 may be arranged at a bottom of the non-directional rotating section 42, and a top of the non-directional rotating section 42 may be movably connected to the thread section 41, such that the non-directional rotating section 42 can rotate axially relative to the thread section 41.

The thickening motor 36 may be detachably connected to the kettle body 1 through a gear assembly; the gear assembly may include a driving gear disc 37 and a driven gear disc 38 that match with each other; the driving gear disc 37 may be connected to a rotating shaft of the thickening motor 36; and the driven gear disc 38 may be sleeved on an outer wall of the kettle body 1.

In order to make the top cover 8 detachable for cleaning and provide sufficient support for the top cover 8, a tail end of the third limb 12 may be placed in a fixed cavity 14 and may be fixed in the fixed cavity 14 by pins 13 on the fixed cavity 14; and the fixed cavity 14 may be fixedly connected to the base 27 through a third column 21.

In order to enable the thickening motor 36 to be completely separated from the kettle body 1 and to facilitate the cleaning of the kettle body 1, the thickening motor 36 may be fixedly connected to the base 27 through a first support arm 30; and the first support arm 30 may be arranged in multiple sections that are fixed by screws 31 in a detachable manner.

A filter screen 52 may be provided inside the cleaning cylinder 47. An ultrasonic vibration plate 48 may be provided on a side wall of the cleaning cylinder 47. A V-shaped inclined surface 50 may be provided at a bottom of the cleaning cylinder 47, and a drain port 49 extending out of the cleaning cylinder 47 may be formed at a bottom of the V-shaped inclined surface 50.

In order to facilitate the disassembly of the kettle body 1, the first limb 20 may be detachably fixed to the first column 18, and the disassembly can be achieved by screws at fixed points. Similarly, in order to facilitate the disassembly of the bottom cover 35, the second limb 22 may be detachably fixed to the second column 26, and the disassembly can be achieved by screws at fixed points, such that the top cover 8, the kettle body 1, the bottom cover 35, and the thickening motor 36 all can be disassembled for cleaning or repair and maintenance.

When a thickening test needs to be conducted, the first limb 20 can be fixed to the first column 18 to make the electrical connection ring 45 in contact with the power supply brush 44, the second limb 22 is fixed to the second column 26, the second lifter 29 is started to make the bottom cover 35 in contact with the bottom of the kettle body 1, and the second support column 32 is adjusted to support the bottom cover 35, such that the bottom cover 35 and the kettle body 1 are pressed tightly to realize the sealing of the bottom of the kettle body 1.

Then the first support arm 30 is fixed such that the thickening motor 36 is in contact with the kettle body 1, and then a thickening object is added into the kettle body 1; the third limb 12 is inserted into the fixing cavity 14, and the third limb 12 is fixed in the fixed cavity 14 by the pins 13; the first lifter 28 and the second lifter 29 are synchronously started to make the kettle body 1 and the bottom cover 35 synchronously approach the top cover 8 and make the top cover 8 in contact with the kettle body 1, and the first support column 6 is adjusted such that the top cover 8 and the kettle body 1 are pressed tightly to realize the sealing of the upper end of the kettle body 1. Since the first support column 6 and the second support column 32 are each provided with a roller 43, the support columns do not prevent the top cover 8 and the bottom cover 35 from rotating with the kettle body 1.

If it is necessary to pressurize inside the kettle body 1, it only needs to connect a pressurization device to the pressurized sealing hole 5 and inflate the kettle body 1 through the pressurized sealing hole 5 to achieve pressurization. The pressurized sealing hole 5 is in a single-pass form, and thus the pressure in the kettle body 1 will still retain after the pressurization device is removed. If it is necessary to heat inside the kettle body 1, it only needs to connect the power supply brush 44 to an external power supply, such that the thickening object inside the kettle body 1 can be heated through the heating coil on the kettle body 1. If it is necessary to acquire relevant data (including but not limited to temperature and pressure) in the kettle body 1 in real time, a corresponding sensor is mounted in the sensor mounting hole 11 and data are sent in real time through wireless transmission.

After the preparation work is ready, the thickening motor 36 is started to make the kettle body 1 rotate at a specified rotational speed, the kettle body 1 drives the thickening object inside to rotate, the thickening object applies a driving force to the blade 40, the blade 40 transmits the driving force to the inner magnet 3, the inner magnet 3 transmits the driving force to the outer magnet 7, and the outer magnet 7 acts on the torque device 46. When the thickening object is viscous to a specified level (that is, a driving force obtained by the outer magnet 7 is greater than a torque force of the torque device 46), the pointer 10 moves to the touch switch 9 and triggers the touch switch 9, indicating the end of the thickening test. A time of the entire thickening test is recorded to obtain the thickening data of the thickening object.

After the test, the operation of the thickening motor 36 can be stopped by a controller, and the first lifter 28 and the second lifter 29 are started to synchronously lower the kettle body 1 and the bottom cover 35, such that the driving gear disc 37 and the driven gear disc 38 are naturally misaligned and disengaged from each other and the kettle body 1 and the top cover 8 are separated from each other; the first rotating motor 15 and the second rotating motor 23 are synchronously started to make the kettle body 1 and the bottom cover 35 synchronously rotate around the fixed shaft 19 to be above the cleaning cylinder 47; the first lifter 28 and the second lifter 29 are started to lower the bottom cover 35 and the kettle body 1 into the cleaning cylinder 47, and then the second lifter 29 is started to separate the bottom cover 35 from the kettle body 1; the second rotating motor 23 is started to make the bottom cover 35 rotate away from the kettle body 1, such that the thickening object inside the kettle body 1 leaks from the bottom of the kettle body 1 into the filter screen 52; and the third lifter 51 is started to lower the brush head 53 into the kettle body 1, the cleaning motor 54 is started to drive the brush head 53 to rotate, and the ultrasonic vibration plate 48 is started to realize the automatic cleaning inside the kettle body 1. If the bottom cover 35 needs to be cleaned by the brush head 53, the bottom cover 35 needs to rotate to be directly below the kettle body 1.

In a specific implementation of the present disclosure, in order to prevent errors caused by accidental touch, the touch switch 9 needs to be continuously touched for 3 s to indicate the end of thickening, that is, only when the touch switch 9 is continuously touched for 3 s, the controller can execute the subsequent control to the thickening motor 36, the lifting motor, the rotating motor, and the cleaning motor 54. A rotational speed sensor can be mounted in the sensor mounting hole 11, and a power of the thickening motor 36 can be adjusted in real time based on data of the rotational speed sensor, thereby maintaining the rotational speed of the kettle body 1 within a standard range for thickening. The power of the thickening motor 36 can also be adjusted in real time by directly detecting the actual rotational speed of the thickening motor 36, thereby maintaining the rotational speed of the kettle body 1.

In addition, a plane in which the first support arm 30 is located is parallel to a plane in which the first limb 20 is located, and a line connecting a center of the kettle body 1 and a center of the thickening motor 36 is perpendicular to the two planes, which enables the kettle body 1 to receive a force of the thickening motor 36 in the X-axis direction, thereby reducing the swing or vibration of the entire instrument and improving a service life of the instrument.

The upper and lower sides of the electrical connection ring 45 are each provided with an insulating material, and a soft rubber is provided on a ring surface of the electrical connection ring 45 to avoid the risk of accidental electric shock. Moreover, the soft rubber can be opened by the power supply brush 44, and a part of the power supply brush 44 that is located outside the electrical connection ring 45 is wrapped with an insulating material, which realizes the power supply and improves the safety of electricity use.

In summary, the present disclosure realizes the simulation of the underground pressure and temperature in the tank body 1, such that a thickening time measured by the thickening performance evaluation instrument is close to a thickening time of a thickening object in the actual underground environment, that is, a measurement result is accurate. Moreover, the kettle body 1 can be cleaned immediately at the end of a test to prevent a thickening object from solidifying in the kettle body 1, which is convenient for subsequent use.

What is claimed is:

1. An automatically-cleanable thickening performance evaluation instrument for drilling lost circulation materials (LCMs), comprising a cleaning device, a kettle body, a thickening motor, a heating component, a test ending component, a top cover, and a bottom cover, wherein upper and lower ends of the kettle body are both opened; the kettle body is arranged in a third bearing inner race, a third bearing outer race is connected to a first limb, and the first limb is configured to limit a position of the kettle body; the kettle body is detachably connected to the thickening motor and driven by the thickening motor to rotate;

the top cover arranged in a first bearing inner race is configured to seal the upper end of the kettle body, a first bearing outer race is connected to a third limb, and the third limb is configured to limit a position of the top cover; a sensor mounting hole for mounting a sensor and a pressurized sealing hole for pressurizing an inside of the kettle body are formed on the top cover;

the bottom cover arranged in a second bearing inner race is configured to seal the lower end of the kettle body, a second bearing outer race is connected to a second limb, and the second limb is configured to limit a position of the bottom cover; a second gantry is provided at a bottom of the second bearing outer race, and the second gantry is provided with a second support column for supporting the bottom cover;

the test ending component comprises the first bearing outer race, a magnetic coupling, and a touch switch, wherein a first gantry is provided on the first bearing outer race, and the touch switch is arranged on the first gantry; an inner magnet of the magnetic coupling is movably arranged on a lower surface of the top cover, and the inner magnet is axially rotatable relative to the top cover, and a lower surface of the inner magnet is connected to a blade; an outer magnet of the magnetic coupling is connected to a torque device, the torque device is arranged on the first gantry, and the outer magnet is provided with a pointer for triggering the touch switch; the first gantry is provided with a first support column for supporting the top cover;

the heating component comprises a heating coil and an electrical connection ring, wherein the heating coil and the electrical connection ring are arranged on the kettle body, the heating coil is connected to the electrical connection ring, and the electrical connection ring is slidably connected to a power supply brush and is connected to a power supply through the power supply brush;

a fixed shaft runs through the first limb and is fixed on a base; a first rotating platform is provided at a tail end of the first limb, the first rotating platform is located in a first rotating cavity, and the first rotating cavity is provided with a first rotating motor for driving the first rotating platform to rotate left or right; the first rotating cavity is connected to a first end of a first column, a second end of the first column runs through the base, and a first lifter is configured for height adjustment of the first column;

the fixed shaft runs through the second limb and is fixed on the base; a second rotating platform is provided at a tail end of the second limb, the second rotating platform is located in a second rotating cavity, and the second rotating cavity is provided with a second rotating motor for driving the second rotating platform to rotate left or right; the second rotating cavity is connected to a first end of a second column, a second end of the second column runs through the base, and a second lifter is configured for height adjustment of the second column;

the cleaning device comprises a cleaning cylinder and a cleaning motor; a brush head is provided on a rotating shaft of the cleaning motor, and the cleaning motor is fixed on a second support arm; the cleaning cylinder is arranged on a side of the base; and a third lifter is provided on a side of the cleaning cylinder, and the second support arm moves up and down through the third lifter; when the kettle body is directly below the brush head, the brush head is lowered into the kettle body for rotating and cleaning.

2. The automatically-cleanable thickening performance evaluation instrument for the drilling LCMs according to claim 1, wherein the first support column and the second support column are structurally identical, and each of the first support column and the second support column comprises a thread section, a non-directional rotating section, and a roller; wherein the roller is arranged at a bottom of the non-directional rotating section, and a top of the non-directional rotating section is movably connected to the thread section, and the non-directional rotating section is axially rotatable relative to the thread section.

3. The automatically-cleanable thickening performance evaluation instrument for the drilling LCMs according to claim 1, wherein the thickening motor is detachably connected to the kettle body through a gear assembly; the gear assembly comprises a driving gear disc and a driven gear disc, and the driving gear disc and the driven gear disc match with each other; the driving gear disc is connected to a rotating shaft of the thickening motor; and the driven gear disc is sleeved on an outer wall of the kettle body.

4. The automatically-cleanable thickening performance evaluation instrument for the drilling LCMs according to claim 1, wherein a tail end of the third limb is placed in a fixed cavity and is fixed in the fixed cavity by pins on the fixed cavity; and the fixed cavity is fixedly connected to the base through a third column.

5. The automatically-cleanable thickening performance evaluation instrument for the drilling LCMs according to claim 1, wherein the power supply brush is fixed on the first limb.

6. The automatically-cleanable thickening performance evaluation instrument for the drilling LCMs according to claim 1, wherein the thickening motor is fixedly connected to the base through a first support arm; and the first support arm is arranged in multiple sections in a detachable manner, wherein the multiple sections are fixed by screws.

7. The automatically-cleanable thickening performance evaluation instrument for the drilling LCMs according to claim 1, wherein a filter screen is provided inside the cleaning cylinder.

8. The automatically-cleanable thickening performance evaluation instrument for the drilling LCMs according to claim 1, wherein an ultrasonic vibration plate is provided on a side wall of the cleaning cylinder.

9. The automatically-cleanable thickening performance evaluation instrument for the drilling LCMs according to claim 1, wherein a V-shaped inclined surface is provided at a bottom of the cleaning cylinder, and a drain port extending out of the cleaning cylinder is formed at a bottom of the V-shaped inclined surface.

* * * * *